(12) United States Patent
Mo

(10) Patent No.: US 7,746,400 B2
(45) Date of Patent: Jun. 29, 2010

(54) METHOD, APPARATUS, AND SYSTEM PROVIDING MULTI-COLUMN SHARED READOUT FOR IMAGERS

(75) Inventor: Yaowu Mo, Arcadia, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 227 days.

(21) Appl. No.: 11/882,308

(22) Filed: Jul. 31, 2007

(65) Prior Publication Data

US 2009/0033779 A1 Feb. 5, 2009

(51) Int. Cl.
*H04N 5/335* (2006.01)
(52) U.S. Cl. .................... 348/308; 250/208.1
(58) Field of Classification Search ......... 348/294–324; 250/208.1–208.6
See application file for complete search history.

(56) References Cited

U.S. PATENT DOCUMENTS

| 5,737,015 | A | 4/1998 | Juen |
| 6,473,124 | B1 | 10/2002 | Panicacci et al. |
| 6,567,028 | B2 * | 5/2003 | Huang et al. ............... 341/155 |
| 6,903,670 | B1 * | 6/2005 | Lee et al. .................. 341/118 |
| 6,953,923 | B2 | 10/2005 | Yang et al. |
| 7,046,284 | B2 * | 5/2006 | Kozlowski et al. ......... 348/308 |
| 7,106,915 | B2 * | 9/2006 | Dierickx ................... 382/312 |
| 7,242,428 | B2 * | 7/2007 | Decker et al. ............. 348/272 |
| 7,443,435 | B2 * | 10/2008 | Loose ...................... 348/294 |
| 7,453,054 | B2 * | 11/2008 | Lee et al. ................ 250/208.1 |
| 2002/0176009 | A1 * | 11/2002 | Johnson et al. ........... 348/229 |
| 2003/0090577 | A1 | 5/2003 | Shirakawa |
| 2006/0050162 | A1 | 3/2006 | Nakamura |
| 2006/0231732 | A1 | 10/2006 | Yan |

FOREIGN PATENT DOCUMENTS

| EP | 1 143 706 A2 | 10/2001 |
| EP | 1 143 706 A3 | 8/2007 |

OTHER PUBLICATIONS

International Search Report (4 pages).

* cited by examiner

*Primary Examiner*—Tuan Ho
*Assistant Examiner*—Don Nguyen
(74) *Attorney, Agent, or Firm*—Dickstein Shapiro LLP

(57) ABSTRACT

An imager and method of operating an imager employing multi-column shared readout circuitry. Columns of a pixel array are organized into groups, each group having a respective multi-column shared readout circuit. The columns of each group are readout serially but in parallel with the columns of other groups. Each multi-column shared readout circuit may comprise a black level correction clamp, a multi-column analog gain amplifier, a analog-to-digital converter, a digital offset correction block, and a digital gain calibration block. A single-column analog gain amplifier may amplify an analog pixel signal value of each column prior to processing by a respective multi-column shared readout circuit.

19 Claims, 7 Drawing Sheets

METHOD, APPARATUS, AND SYSTEM PROVIDING MULTI-COLUMN SHARED READOUT FOR IMAGERS

FIELD OF THE INVENTION

The disclosed embodiments relate generally to the field of semiconductor imagers having multi-column shared readout circuitry.

BACKGROUND OF THE INVENTION

A CMOS imager circuit includes a focal plane array of pixel cells, each one of the cells including a photosensor, for example, a photogate, photoconductor, or a photodiode overlying a substrate for accumulating photo-generated charge in the underlying portion of the substrate. Each pixel cell has a charge storage region, formed on or in the substrate, which is connected to a gate of an output transistor that is part of a readout circuit. The charge storage region may be constructed as a floating diffusion region. In some imager circuits, each pixel cell may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state before the transfer of charge to it; (4) transfer of charge to the storage region accompanied by charge amplification; (5) selection of a pixel for readout; and (6) output and amplification of a signals representing pixel charge and pixel reset states. Photo charge may be amplified when it moves from the initial charge accumulation region to the storage region. The charge at the storage region is typically converted to a pixel output voltage by a source follower output transistor.

CMOS imagers of the type discussed above are generally known, as discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524, and U.S. Pat. No. 6,333,205, all assigned to Micron Technology, Inc.

FIG. 1A illustrates a conventional imager implementing a serial readout for the pixel signals in the columns of array 101. Programmable gain amplifier 105 and a serial analog-to-digital converter 106 receive the column pixel signals in sequence. In a CMOS imager, each sample-and-hold circuit 102 typically samples and holds a reset $V_{rst}$ and a photo $V_{sig}$ signal for a respective pixel of an array 101 row being read. The programmable gain amplifier 105 typically includes a differential amplifier for subtracting the $V_{rst}$ and $V_{sig}$ signals and supplying the result to a downstream processing circuit. Thus, pixel signals from all columns of the pixel array 101 are output in series to a single gain amplifier 105 and analog-to-digital converter 106. The illustrated imager includes one sample-and-hold circuit 102 for each column. Optionally, a column amplifier may be provided between each sample-and-hold circuit 102 and a respective column of pixel array 101. The sample-and-hold circuits 102 are selectively coupled, one at a time, to the programmable gain amplifier 105 via a multiplexer 103 controlled by a column scanner 104. The serial readout scheme depicted in FIG. 1A has several advantages. For example, the scheme is easy to design and optimize and well-suited for small imagers.

Serial readout schemes are not, however, well-suited for use in large-format or high-speed imaging applications where a pixel array 101 may contain thousands of columns. One drawback is readout speed, which is limited by the throughput of the gain amplifier 105 and the analog-to-digital converter 106. In addition, the high data throughput rate in large-format, high-speed image sensors makes current consumption unacceptably high and chips unacceptably large due, in part, to the switched-capacitor circuits used in the readout circuitry of most high-precision imagers. Switched-capacitor circuits are typically used in the pixel readout analog path, including column sample-and-hold circuit 102, programmable gain amplifier 105, which typically includes a differential amplifier for subtracting the $V_{rst}$ and $V_{sig}$ signals, and additional amplifier stages of analog-to-digital converter 106.

FIG. 2 is a general graph representing the settling time of a switched-capacitor circuit, which may be used, for example, in the readout circuitry of the imager illustrated in FIG. 1A. FIG. 2 illustrates an exponential gain-bandwidth (GBW) limited settling time and a slew rate limited settling time. In high-speed circuits, the operational amplifier current required by the GBW of a switched-capacitor circuit is often higher than that required by the slew rate. In other words, GBW limited settling is dominant, and current consumption has a quadratic dependence to sampling rate. In slow- and medium-speed circuits, slew rate limited settling is dominant, and current consumption is linearly dependent on the clock frequency. Thus, the settling time in high-speed circuits can be undesirably long and reduce throughput, creating a bottleneck in a serial readout scheme, such as the scheme illustrated in FIG. 1A.

Serial readout schemes also suffer from increased noise and power consumption due to large parasitic capacitance, mainly coming from the column select switches of multiplexer 103 and long video lines connecting the column select switches to the input of the programmable gain amplifier 105. This large parasitic capacitance dramatically reduces the feedback factor of the gain amplifier 105 and increases the power required to operate it, while simultaneously increasing amplifier noise and offset as well as digital crosstalk or interference in the video line. Variations in column sampling capacitance, mainly due to inhomogeneous thickness of the capacitor dielectric film, also contribute to fixed pattern noise or shading.

In contrast to the serial readout scheme described above with reference to FIG. 1A, a "simple column parallel" readout architecture comprises dedicated readout circuitry for each column of a pixel array 111, as shown in FIG. 1B. The per-column readout circuitry typically comprises a sample-and-hold circuit 112, a gain amplifier 113, and an analog-to-digital converter 114. Generally, the gain amplifier 113 includes a function for subtracting the $V_{rst}$ and $V_{sig}$ signals. Optionally, the column sample-and-hold circuit 112 and gain amplifier 113 may be combined. The outputs from the readout circuits may be stored in a digital line memory 115 and subsequently output to an image processor (not shown).

Although column parallel readout architectures overcome some of the readout bottlenecks and parasitic capacitance issues associated with serial readout architectures, implementing an analog-to-digital converter 114 for every column is problematic because the size of each analog-to-digital converter 114 is constrained to the width of a single column of the pixel array 111. Single-slope analog-to-digital converters (also called "ramp analog-to-digital converters") are often used in per-column implementations because the many analog-to-digital converters can share a common ramp signal. Thus, only a comparator and a latch have to be implemented in every column. However, the large number of analog-to-digital converters requires more power to operate than a serial readout scheme employing only one analog-to-digital converter. Moreover, since the conversion cycles of single-slope analog-to-digital converters increase exponentially with resolution, parallel readout architectures, such as the one illustrated in FIG. 1B, are not suitable for high-accuracy applications because of the difficulty associated with designing sufficiently low-offset, low-delay, and low-power comparators that fit within a single column width.

Other kinds of analog-to-digital converters having a simpler architecture with fewer conversion cycles, and therefore lower resolution, may also be used. For example, successive approximation register (SAR) and algorithm (or "cyclic") analog-to-digital converters can also be configured to fit within a single column width, as required by column parallel readout architectures. However, to obtain high accuracy, SAR and cyclic analog-to-digital converters must be relatively large, since their accuracy is determined by capacitor mismatching. Therefore, it is difficult to realize high conversion accuracy in a column parallel readout scheme because large-value capacitors and high-performance comparators cannot be readily implemented within a single column width. Moreover, column parallel readout schemes are undesirable because they require a customized design that must be redesigned whenever pixel size, and consequently column width, is scaled down. Fixed pattern noise from gain/offset mismatching between columns is also a concern.

Recently, a multi-channel serial readout architecture, which comprises several analog-to-digital converters and gain amplifiers, as shown in FIG. 1C, has been used in large-format imagers to improve throughput. Similar to the readout architectures described above, a sample-and-hold circuit 122 is coupled to each column of a pixel array 121. A multiplexer 123 controlled by a column scanner 124 selectively couples the sample-and-hold circuits 122 to one of several readout channels. Each readout channel comprises a programmable gain amplifier 125 and an analog-to-digital converter 126. Because readout channels can be flexibly arranged anywhere on the chip close to the column sample-and-hold circuit 122 and multiplexer 123, many limitations of the column parallel readout architecture discussed above are alleviated. However, the long video lines 123a of multiplexer 123, create substantial parasitic capacitance and, therefore, the multi-channel serial readout scheme suffers from the same noise limitations as the simple serial readout scheme described above with reference to FIG. 1A. Furthermore, parasitic capacitance between adjacent channels will lead to crosstalk and generate artifacts in the resulting image. Column fixed pattern noise resulting from channel mismatching is also a concern.

There is a need in the art for an efficient readout architecture that can easily be scaled to accommodate imagers with reduced pixel pitch and provides the higher throughput associated with existing parallel readout architectures while simultaneously providing the improved image quality and reduced power consumption associated with serial readout architectures.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized. The progression of processing steps described is an example and it should be noted that the sequence of steps is not limited to that set forth herein and may be changed as is known in the art, with the exception of steps necessarily occurring in a certain order. Embodiments described herein may be formed using conventional processing techniques known to those skilled in the art.

U.S. patent application Ser. No. 10/957,724 ("the '724 application") by Nakamura, which is assigned to Micron Technology, Inc., describes an image sensor with semi-column parallel pipeline analog-to-digital converters. The embodiments described herein build on and improve upon the Nakamura design reducing readout noise, incorporating digital offset correction, achieving high light sensitivity, and providing better gain linearity and finer gain setting steps, as described in detail below.

Figure 1A:
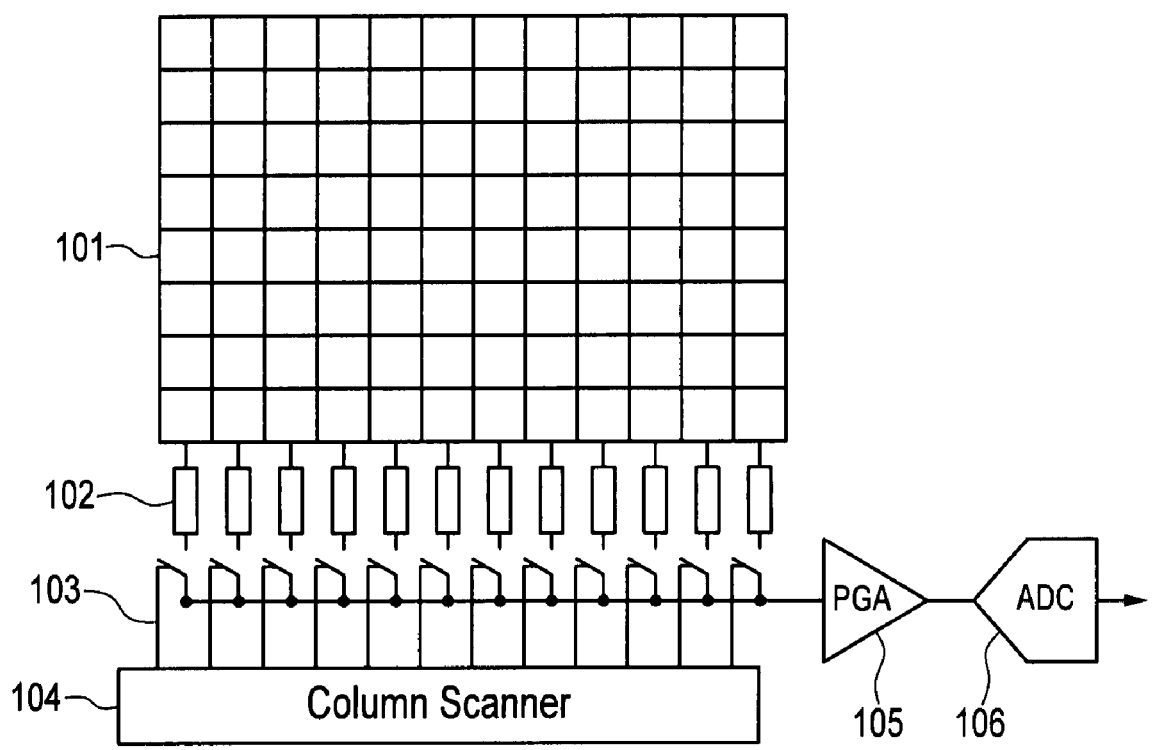
FIG. 1A depicts a simple serial pixel array readout circuit in accordance with the prior art.
Figure 1B:
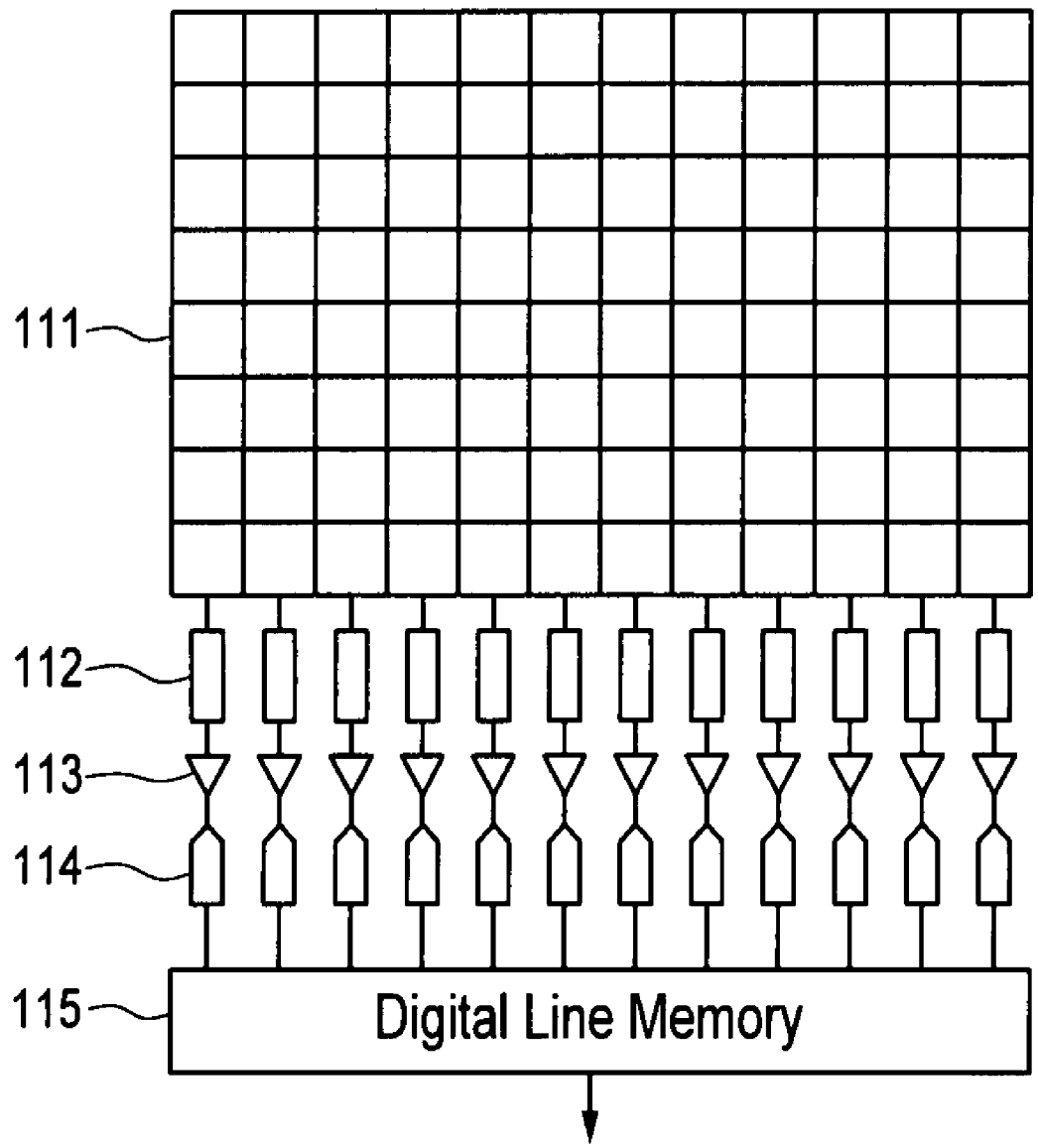
FIG. 1B depicts a simple column-parallel pixel array readout circuit in accordance with the prior art.
Figure 1C:
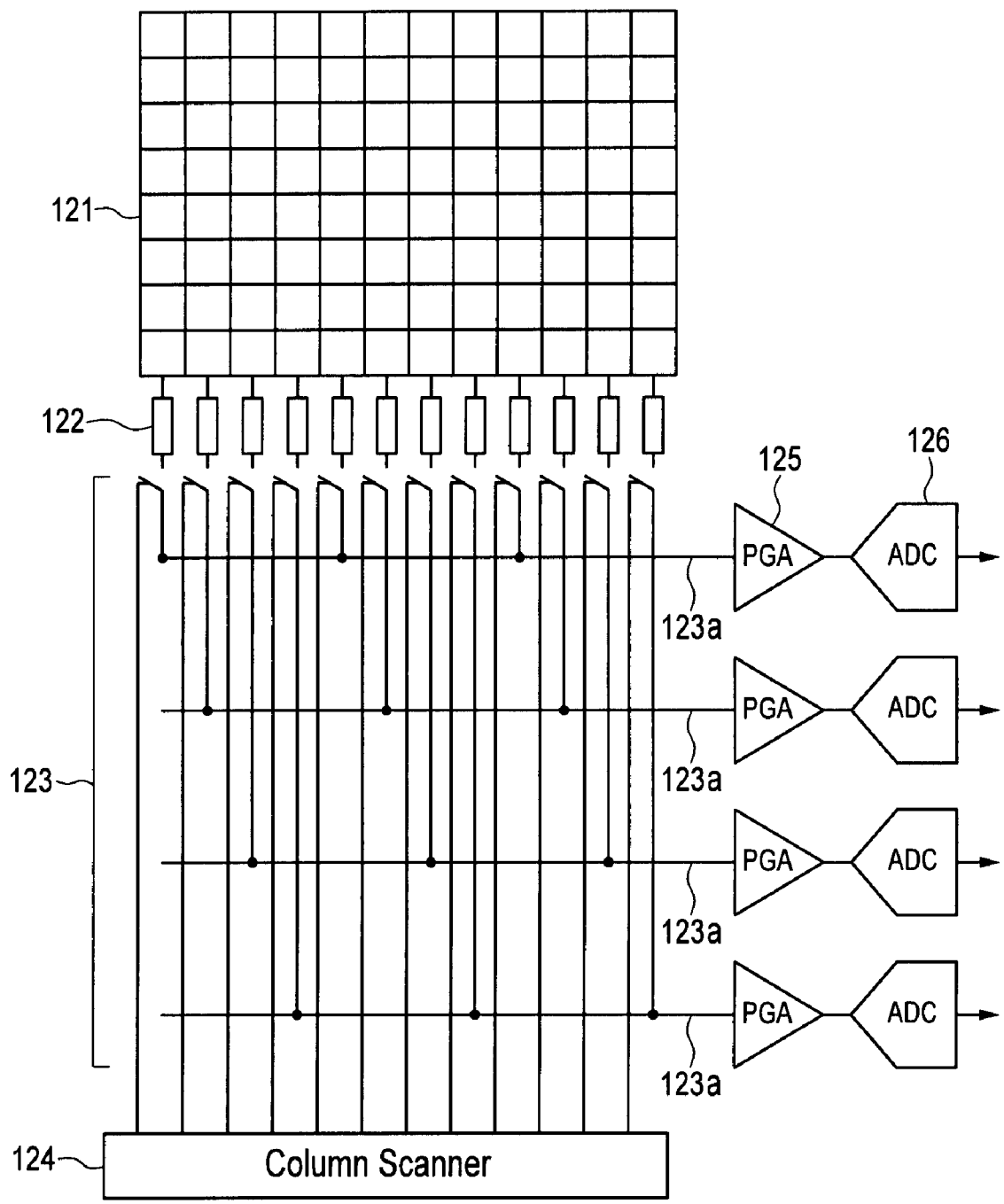
FIG. 1C depicts a multi-channel pixel array readout circuit in accordance with the prior art.
Figure 2:
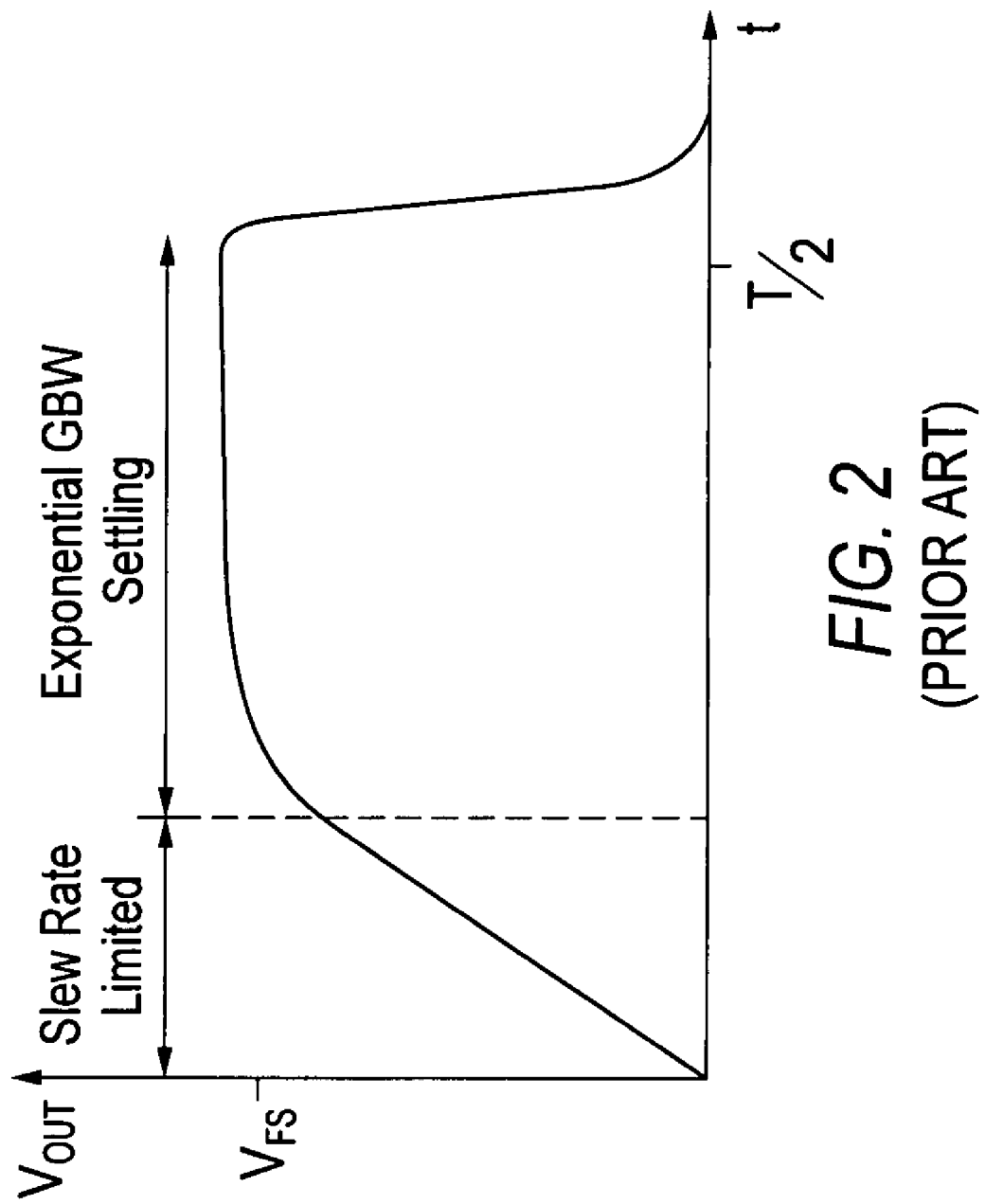
FIG. 2 is a voltage diagram illustrating the settling procedure of a switched-capacitor circuit.
Figure 3:
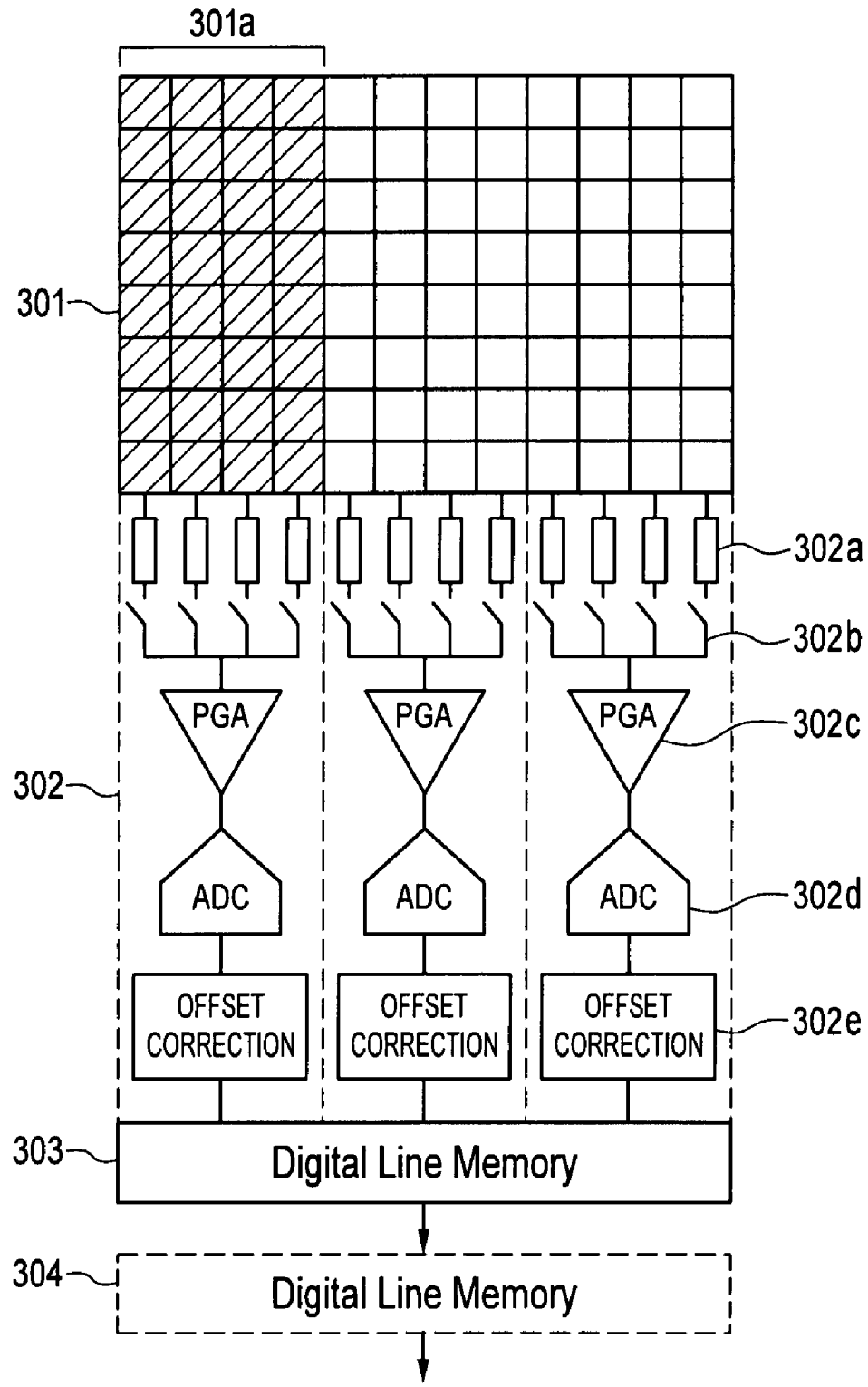
FIG. 3 depicts a multi-column shared readout circuit in accordance with an embodiment disclosed herein.

FIG. 3 illustrates a multi-column shared readout architecture in accordance with a disclosed embodiment. Columns of a pixel array 301 are divided into groups, such as, for example the four adjacent columns of group 301a. It should be appreciated that groups need not necessarily comprise four columns or even adjacent columns. For example, depending on the number of pixels in a pixel array and the required throughput and image quality, groups may comprise 8, 16, 32, 64, 128, or even more columns. Moreover, although a simplified pixel array 301 comprising only 96 pixels is shown, a pixel array 301 may comprise thousands or even millions of pixels. Indeed, the multi-column shared readout architecture disclosed herein may be used to readout pixel arrays 301 containing 20 million or more pixels.

Each group 301a has an associated readout channel 302. Each readout channel 302 comprises a plurality of sample-and-hold circuits 302a, each coupled to a respective column within the group 301a. A column amplifier may be coupled between each column of pixel array 301 and each respective sample-and-hold circuit 302a. Each sample-and-hold circuit 302a is selectively coupled in series to respective readout circuitry via a multiplexer 302b. Only one sample-and-hold circuit 302a associated with each column group 301a is coupled to the readout circuitry at a time, however, one sample-and-hold circuit 302a from each other column group may simultaneously be coupled to respective readout circuitry via a respective multiplexer 302b. In this way, the columns within each group are readout serially but in parallel with the columns of other groups.

The readout circuitry within each channel 302 may comprise a programmable analog gain amplifier 302c, an analog-to-digital converter 302d, and an offset correction block 302e. Each readout channel 302 may also comprise additional circuitry, as described in detail below with reference to FIG. 4.

Outputs from each readout channel 302 may be stored in a digital line memory 303. A sense amplifier (not shown) coupled to the digital line memory 303 may be used to readout values from the digital line memory 303 for further processing by an image processor (not shown), which may be on the same chip or connected to the imager via a bus, as described below with reference to FIG. 5. A second digital line memory 304 may also be employed, with values shifted from the first digital line memory 303 to the second digital line memory 304 as each row of the pixel array 301 is being readout. This enables the first digital line memory 303 to receive values from each readout channel 302 while values from the second line memory 304 are simultaneously readout for further processing.

Figure 4:
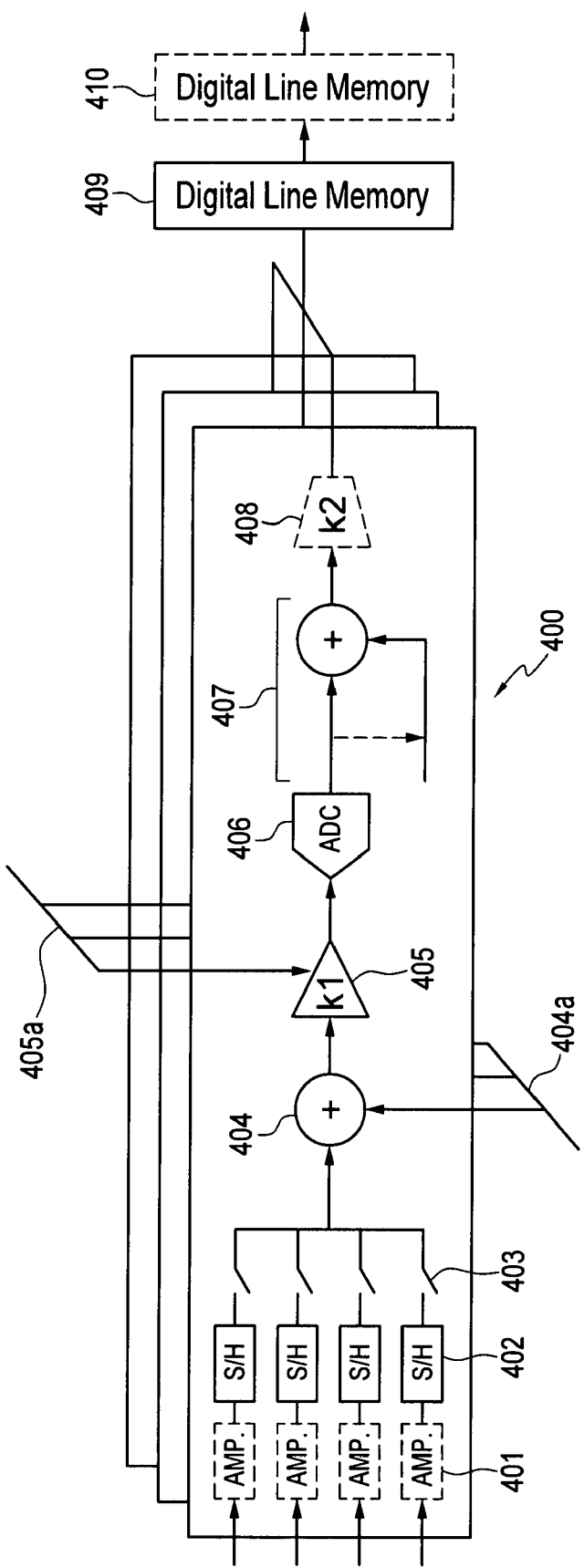
FIG. 4 depicts a multi-column shared readout circuit in accordance with an embodiment disclosed herein.

Elements of readout channel 302 will now be described in greater detail with reference to FIG. 4, which depicts readout circuitry 400 associated with each group of columns. Signals from each column may be amplified by optional column amplifiers 401 and stored in sample-and-hold circuits 402. In one embodiment, each sample-and-hold circuit 402 includes a differential amplifier to subtract $V_{rst}$ and $V_{sig}$ signals received from a respective column. A multiplexer 403 selectively couples an output of one of the sample-and-hold circuits (i.e., an analog pixel signal value corresponding to the difference between the $V_{rst}$ and $V_{sig}$ signals) to additional multi-column shared readout circuitry. The multi-column shared readout circuitry may include an analog black level clamp 404. The black level clamp 404 may adjust pixel signal values based on a black level parameter shared among the multi-column shared readout circuits 400 and conveyed via shared signal line 404a. An analog programmable gain amplifier 405 also adjusts pixel signal values. The gain adjustment may be based on a gain adjustment parameter shared among the multi-column shared readout circuits 400 and conveyed via shared signal line 405a.

An analog-to-digital converter 406 converts an analog pixel signal value from amplifier 405 to a digital pixel value. A digital offset correction block 407 may adjust the digital pixel value output from the analog-to-digital converter 406 to correct errors introduced, for example, by imperfections in the analog-to-digital converter 406. The offset correction may be based at least in part on a value output by the analog-to-digital converter 406 or at least in part by some other value, such as for example, an offset correction parameter derived from known defects in a particular analog-to-digital converter 406. Several self-calibrating clock cycles, for example 32 or 64 cycles, in a frame blanking or row blanking interval can be used to calibrate the offset in each channel by frame or row. A digital gain calibration block 408 may also be included in each multi-column shared readout circuit to further correct image gain.

Digital pixel values output from each multi-column shared readout circuit 400 may be stored in a digital line memory 409. As described above with reference to FIG. 3, a second digital line memory 410 may be coupled to the first digital line memory 409, with digital pixel values shifted from the first digital line memory 409 to the second digital line memory 410 as each row of the pixel array 301 is readout to improve readout speed and efficiency. Using a sense amplifier (not shown) digital pixel values stored in the first digital line memory 409, or in the second digital line memory 410 if two digital line memories are employed, can be readout and transmitted to an image processor or other device for further processing. The image processor may be on the same chip as the multi-column shared readout circuit 400 or connected via a bus, as described below with reference to FIG. 5.

Figure 5:
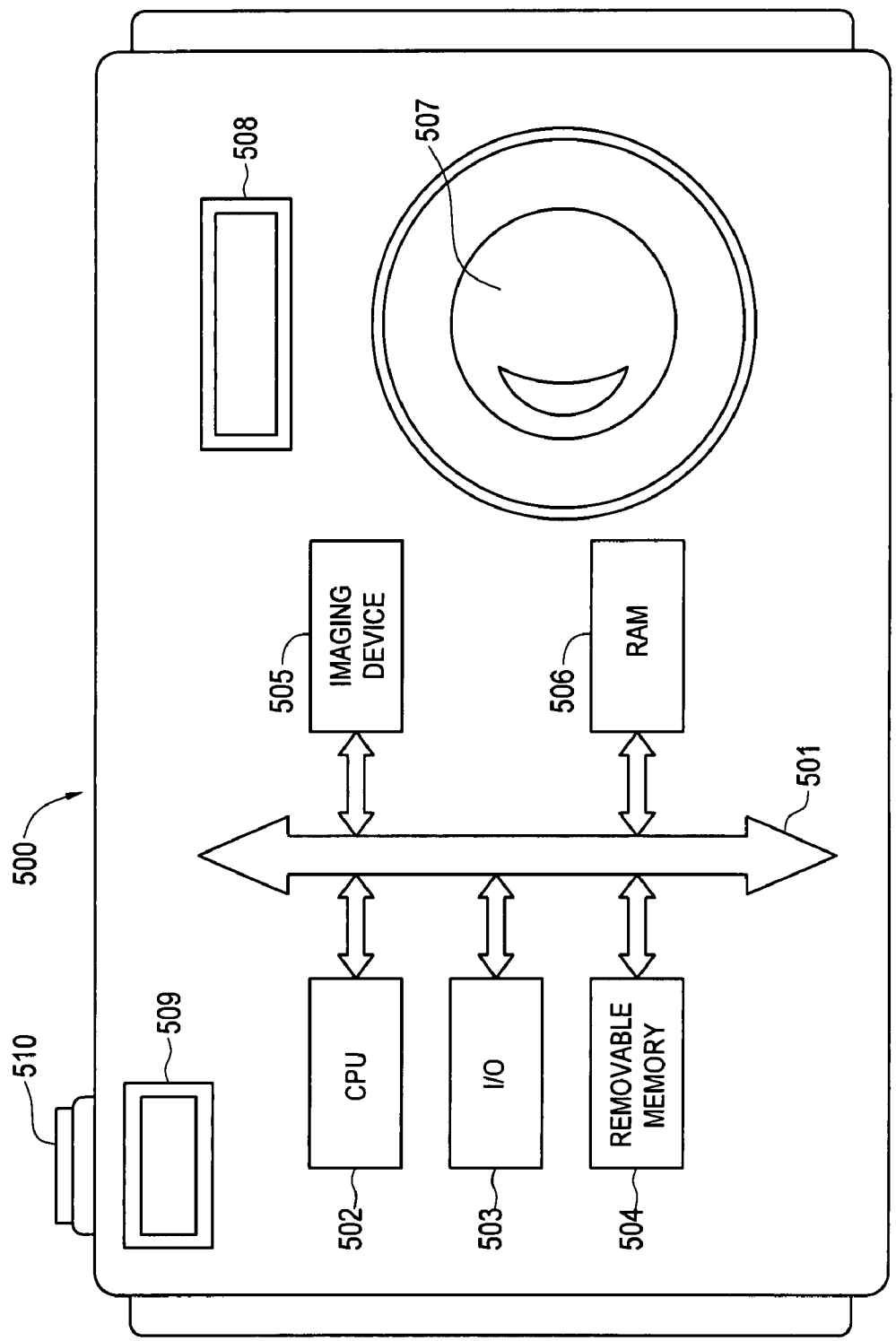
FIG. 5 depicts a camera system comprising an imager constructed in accordance with an embodiment described herein.

FIG. 5 shows a typical system 500, such as, for example, a camera. The system 500 includes an imaging device 505 constructed in accordance with an embodiment described herein. The system 500 is an example of a system having digital circuits that could include image sensor devices. Without being limiting, such a system could include a computer system, camera system, scanner, machine vision, vehicle navigation system, video phone, surveillance system, auto focus system, star tracker system, motion detection system, image stabilization system, and other systems employing an imager.

System 500, for example, a camera system, includes a lens 507 for focusing an image on the imagine device 505 when a shutter release button 510 is pressed. System 500 generally comprises a central processing unit (CPU) 502, such as a microprocessor that controls camera functions and image flow, and communicates with an input/output (I/O) device 503 over a bus 501. The imager of device 500 also communicates with the CPU 502 over the bus 501. The processor-based system 500 also includes random access memory (RAM) 506, and can include removable memory 504, such as flash memory, which also communicates with the CPU 502 over the bus 501. The imaging device 505 may be combined with the CPU 502, with or without memory storage on a single integrated circuit or on a different chip than the CPU.

The embodiments described herein provide reduced readout noise, incorporate digital offset correction, achieve greater light sensitivity, and provide better gain linearity and finer gain setting steps. More specifically, some embodiments described herein combine a first analog gain amplifier coupled between each column and a respective sample-and-hold circuit and a second analog gain amplifier within the multi-column shared readout circuit. The first analog gain amplifier reduces readout noise by reducing signal routing length. The second analog gain amplifier helps to achieve improved light sensitivity. In addition, the extra amplifier implementation space afforded by column grouping allows for a higher quality amplifier and more complicated control logic, thereby providing better gain linearity and fine gain steps. The additional space also permits higher quality analog-to-digital converters to be implemented. For example, each analog-to-digital converter could be any one of a Nyquist analog-to-digital converter, a sub-range analog-to-digital converter, a interpolation analog-to-digital converter, an oversampled analog-to-digital converter, a sigma-delta analog-to-digital converter, and a fully differential analog-to-digital converter. Moreover, by incorporating an offset correction block in the digital portion of each multi-channel shared readout circuit, disclosed embodiments reduce cross-channel mismatching, yielding a higher quality image.

While embodiments of the invention have been described in detail in connection with the examples known at the time, it should be readily understood that they are not limited to such disclosed embodiments. Rather, they can be modified to incorporate any number of variations, alterations, substitutions, or equivalent arrangements not heretofore described. Accordingly, the invention is not to be seen as limited by the foregoing description, but is only limited by the scope of the claims.

What is claimed as new and desired to be protected by Letters Patent of the United States is:

1. An imager, comprising:
   an array of pixels organized as a plurality of rows and columns;
   a plurality of sample-and-hold circuits, each coupled to a respective column; and a plurality of multiplexers, each configured to selectively couple one of a group of columns to a respective multi-column shared readout circuit, wherein each multi-column shared readout circuit comprises:
an analog gain amplifier;
an analog-to-digital converter coupled to the analog gain amplifier; and
a digital offset correction block coupled to the analog-to-digital converter.

2. The imager of claim 1, wherein each group of columns comprises adjacent columns.

3. The imager of claim 2, wherein each group of columns comprises at least 4 adjacent columns.

4. The imager of claim 3, wherein each group of columns comprises one of 4, 8, 16, 32, 64, and 128 adjacent columns.

5. The imager of claim 1, wherein each multi-column shared readout circuit further comprises an analog black level correction clamp coupled between a respective multiplexer and analog gain amplifier.

6. The imager of claim 1, wherein each multi-column shared readout circuit further comprises a digital gain calibration block coupled to the digital offset correction block.

7. The imager of claim 1, wherein each multi-column shared readout circuit further comprises a digital offset correction block.

8. A CMOS imager, comprising:
an array of pixels organized as a plurality of rows and columns;
a plurality of first analog gain amplifiers, each coupled to a respective column;
a plurality of sample-and-hold circuits, each coupled to a respective first analog gain amplifier; and
a plurality of multi-column shared readout circuits, each selectively coupled to a respective group of sample-and-hold circuits, each multi-column shared readout circuit comprising:
an analog black level correction clamp;
a second analog gain amplifier coupled to the analog black level correction clamp;
an analog-to-digital converter coupled to the second analog gain amplifier;
a digital offset correction block coupled to the analog-to-digital converter; and
a digital gain calibration block coupled to the digital offset correction block.

9. The CMOS imager of claim 8, wherein the analog black level correction clamp is configured to receive a black level correction parameter from a signal line shared among each of the plurality of multi-column shared readout circuits.

10. The CMOS imager of claim 8, wherein the second analog gain amplifier is configured to receive a gain adjustment parameter from a signal line shared among each of the plurality of multi-column shared readout circuits.

11. The CMOS imager of claim 8, wherein the digital offset correction block is configured to vary an offset correction parameter based at least in part on an output of the analog-to-digital converter.

12. A processor system, comprising:
a processor;
an imaging device coupled to the processor, the imaging device comprising:
an array of pixels organized as a plurality of rows and columns;
a plurality of sample-and-hold circuits, each coupled to a respective column; and
a plurality of multiplexers, each configured to selectively couple a group of sample-and-hold circuits to a respective multi-column shared readout circuit,
wherein each multi-column shared readout circuit comprises:
a multi-column analog gain amplifier;
an analog-to-digital converter coupled to the analog gain amplifier; and
a digital offset correction block coupled to the analog-to-digital converter.

13. The processor system of claim 12, wherein the imaging device further comprises a plurality of single-column analog gain amplifiers coupled between each of the plurality of columns and a respective sample-and-hold circuit.

14. The processor system of claim 13, wherein each single-column analog gain amplifier and each sample-and-hold circuit is narrower than a respective column width.

15. The processor system of claim 12, wherein each multi-column shared readout circuit spans at least two respective column widths.

16. A method of fabricating an imager, comprising the steps of:
forming an array of pixels organized as rows and columns;
forming a plurality of sample-and-hold circuits, each coupled to a respective column; and
forming a plurality of multiplexers, each configured to selectively couple one of a group of adjacent columns to a respective multi-column shared readout circuit,
wherein fabrication of the multi-column shared readout circuit comprises the steps of:
forming a plurality of analog black level clamps, each coupled to a respective multiplexer;
forming a plurality of multi-column analog gain amplifiers, each coupled to a respective analog black level clamp;
forming a plurality of analog-to-digital converters, each coupled to a respective single-column gain amplifier;
forming a plurality of digital offset correction blocks, each coupled to a respective analog-to-digital converter;
forming a plurality of digital gain calibration blocks, each coupled to a respective digital offset correction block; and
forming a digital line memory configured to receive and store pixel values output by each of the plurality of digital gain calibration block.

17. The method of fabricating an imager of claim 16, wherein each group of adjacent columns comprises between 2 and 128 columns.

18. The method of fabricating an imager of claim 17, wherein each group of adjacent columns comprises 4 columns.

19. The method of fabricating an imager of claim 16, further comprising forming a plurality of single-column analog gain amplifiers, each coupled between a respective column and sample-and-hold circuit.

* * * * *